United States Patent [19]
Otter et al.

[11] Patent Number: 5,192,612
[45] Date of Patent: Mar. 9, 1993

[54] POSITIONABLE-REPOSITIONABLE PRESSURE-SENSITIVE ADHESIVE

[75] Inventors: James W. Otter, Geneva; Gary R. Watts, Ashtabula, both of Ohio

[73] Assignee: Avery International Corporation, Pasadena, Calif.

[21] Appl. No.: 478,675

[22] Filed: Feb. 12, 1990

Related U.S. Application Data

[63] Continuation-in-part of Ser. No. 429,719, Oct. 31, 1989, abandoned.

[51] Int. Cl.$^5$ .............................................. C09J 7/02
[52] U.S. Cl. ..................... 428/355; 428/343
[58] Field of Search ............................... 428/355, 343

[56] References Cited

U.S. PATENT DOCUMENTS

| | | | |
|---|---|---|---|
| 3,258,454 | 6/1966 | Vona | 525/330.1 |
| 3,301,741 | 1/1967 | Henrickson | 428/343 |
| 3,314,838 | 4/1967 | Erwin | 156/71 |
| 3,331,729 | 7/1967 | Danielson et al. | 161/162 |
| 3,483,020 | 12/1969 | Giellerup | 428/355 |
| 3,892,821 | 7/1975 | Koleske | 525/533 |
| 4,049,483 | 9/1977 | Loder | 428/355 |
| 4,107,380 | 8/1978 | Wiesman | 428/355 |
| 4,163,077 | 7/1979 | Antonsen | 428/355 |
| 4,376,151 | 3/1983 | Parrotta | 428/323 |
| 4,415,615 | 11/1983 | Esmay et al. | 428/40 |
| 4,556,595 | 12/1985 | Ochi | 428/143 |
| 4,710,536 | 12/1987 | Klingen et al. | 524/493 |
| 4,769,285 | 9/1988 | Rasmussen | 428/355 |
| 4,783,354 | 11/1988 | Fagan | 428/355 |
| 4,977,003 | 12/1990 | Brown | 428/355 |
| 4,985,302 | 1/1991 | Sala | 428/355 |
| 4,994,322 | 2/1991 | Delgado | 428/355 |

FOREIGN PATENT DOCUMENTS 52-133339 11/1977 Japan.

OTHER PUBLICATIONS

Delamonte, John; The Technology of Adhesives; "Coumarone-Indene Resin Adhesives"; pp. 106–111; 1947.

Primary Examiner—Jenna L. Davis
Attorney, Agent, or Firm—Pearne, Gordon, McCoy & Granger

[57] ABSTRACT

A positionable-repositionable pressure-sensitive adhesive may be repeatedly applied to a surface and removed during an initial installation time period. The adhesive contains an adhesive base resin and coacting detackifying resin and particulate components which temporarily reduce the tack and peel strength of the adhesive. Upon passage of time and/or application of thermal energy, adhesion build-up occurs to a maximum value. The pressure-sensitive adhesive may be used as an adhesive layer in a laminate for tapes, signs and decorative and protective applications including vehicle marking and architectural installations.

29 Claims, 3 Drawing Sheets

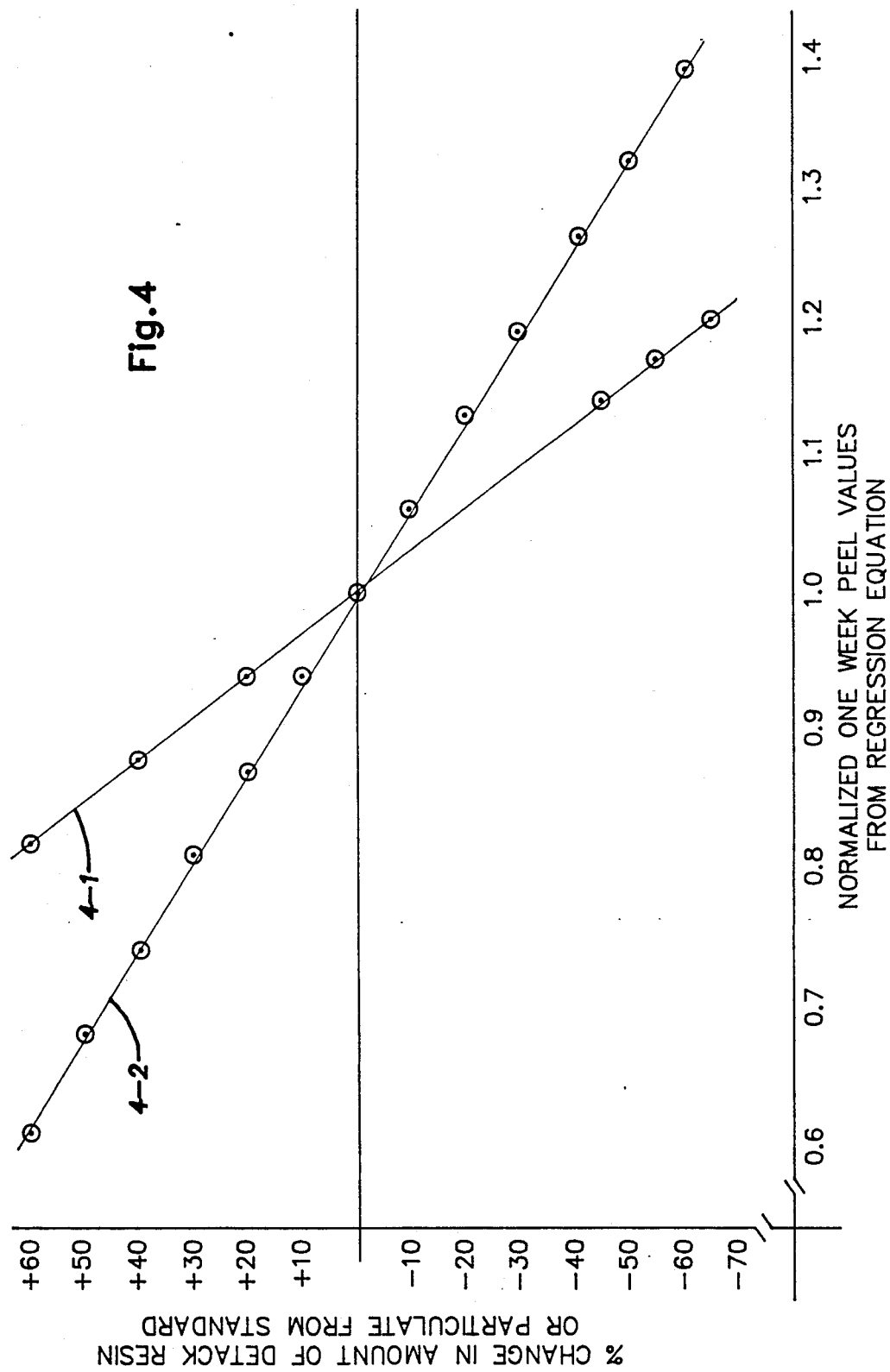

POSITIONABLE-REPOSITIONABLE PRESSURE-SENSITIVE ADHESIVE

BACKGROUND OF THE INVENTION AND PRIOR ART

This application is a continuation-in-part of application Ser. No. 429,719, filed Oct. 31, 1989 now abandoned.

This invention relates to pressure-sensitive adhesives for application to substrates or carrier layers to provide laminates having positionable-repositionable properties and to methods of adhering laminates to mounting or application surfaces to provide such properties.

The pressure-sensitive adhesives and laminates of interest herein are characterized by low initial tack and adhesion properties which enable the laminate to be adhered with pressure to a mounting surface and removed therefrom before any appreciable build-up in adhesion occurs. The laminates are initially removable without damage to the substrate or transfer of adhesive to the mounting surface. Preferably, the pressure-sensitive adhesive permits repeated application of the laminate to the surface and removal therefrom during an initial time period of 15 to 30 minutes or longer. Further, the layer of pressure-sensitive adhesive should not stick to itself during such initial time period.

Upon passage of time, the adhesion build-up should be sufficient to secure the laminate to the mounting or application surface in accordance with its intended purpose. For example, permanent bond systems result in a maximum or ultimate adhesion which prevents removal of the laminate from the mounting surface without laminate damage such as tearing or distortion. The development of maximum or ultimate adhesion build-up may take about one week at room temperature.

In many applications, it is preferable that adhesion build-up may also be achieved by application of heat. This enables the development of the ultimate adhesion to be expedited.

The laminates may be used in a wide range of decorative or protective applications. For example, the laminates may be used in signs, tapes and vehicle marking such as decorative decals and fleet marking and in architectural applications such as service station canopy decoration. The laminates may be used in the form of tapes, sheets or roll stock. The substrate or carrier layer may comprise a facestock material which can be printed, coated or over-laminated to provide desired indicia.

The term positionable or positionability is used herein to indicate a sufficiently low degree of tack to allow a laminate having its adhesive surface in contact with a mounting surface to be slid across the mounting surface without sticking or grabbing. An illustrative test includes the manual sliding of a 3"×8" laminate test sample along a clean aluminum surface without contact pressure other than the weight of the sample. Positionability is indicated by a smooth sliding movement of the test sample without damage to the specimen or removal of adhesive.

A quantitative test for measurement of pressure-sensitive adhesive tack is set forth in ASTM D 2979-88. Herein, positionability is considered to be achieved by pressure-sensitive adhesives having tack values ranging up to about 90 g. using a Polyken brand tester in accordance with the test procedure.

Adhesion build-up may be quantitatively measured by means of the 180° peel test as set forth in PSTC Test Method No. 1. Herein, 180° peel test values are determined at time intervals ranging from one minute to thirty minutes after the application of the pressure-sensitive adhesive to a mounting surface in order to further characterize tack and adhesion build-up characteristics. Peel values are also measured after one week following the application of the pressure-sensitive adhesive to a surface in order to determine the maximum or ultimate peel strength and degree of adhesion build-up.

Repositionable or repositionability is used herein to indicate the ability to install a laminate with pressure to the mounting or application surface in a final manner and to remove it therefrom repeatedly prior to a build-up of adhesion during an initial time period and without damage to the laminate. Therefore, repositionability is also a function of the strength of the substrate or facestock material. In addition, the laminate also retains its positionability characteristics after removal from the mounting surface. The mounting surface may be a metallic surface, a painted surface or other suitable surface cleaned for adhesive application.

The use of solid particles disposed along the adhesive surface of a pressure-sensitive adhesive layer and partially embedded therein to space the adhesive surface from the mounting or application surface to enable positionability is disclosed in U.S. Pat. No. 4,556,595. A wide variety of particles are disclosed including calcium carbonate, aluminum hydroxide and silica. The particle size is indicated to be less than 10 microns and in the range of 0.001 micron to 3 microns. Upon application of sufficient installation pressure to the laminate, the particles are embedded in the adhesive so as to no longer interfere with the adhesion. Thus, the laminate is not repeatedly positionable.

Japanese Patent No. 52133339, dated Nov. 8, 1977, is reported to disclose a multi-layered acrylic pressure-sensitive adhesive having silica acid powder of less than 0.1 micron particle size concentrated at the surface thereof. A solvent solution of the adhesive containing dispersed particles is evaporated to form a film which is more than 15 microns thick. It is indicated that release paper is not required, positioning may be done at low pressure and final bonding is achieved at high pressure.

The prior art also discloses a variety of laminate materials having a pressure-sensitive adhesive layer including micro-balloons disposed therein to aid the positionability of the laminate. U.S. Pat. No. 3,331,729 discloses the use of thin-walled fragile micro-balloons which are randomly distributed over and partially embedded in the surface of the adhesive layer. The micro-balloons space the adhesive from the surface to allow positionability of the laminate. Thereafter, sufficient pressure is applied to crush the micro-balloons and permit the adhesive to adhere to the substrate. The laminate is thereby fully installed and not capable of further movement. U.S. Pat. No. 4,376,151 also discloses the use of micro-balloons which allow positionability until a threshold pressure is applied to displace the micro-balloons.

U.S. Pat. No. 3,314,838 discloses a monolayer of micro-balloons covered with a thin film of adhesive which provides a slidable pebbled surface prior to the application of pressure. Upon installation, sufficient pressure is applied to crush the micro-balloons and cause the adhesive to contact the application surface.

The prior art also discloses the addition of particles and micro-balloons to pressure-sensitive adhesives for other purposes. For example, U.S. Pat. No. 4,415,615 discloses the use of of thixotropic agents such as fumed silica in its microbubble-filled cellular adhesive layers. Increased cohesiveness is indicated in U.S. Pat. No. 4,710,536 by the addition of hydrophobic silica.

SUMMARY OF INVENTION

It has now been discovered that a positionable-repositionable pressure-sensitive adhesive may be provided by incorporation of a detackifying resin and a detackifying particulate or filler in an adhesive base resin. Optionally, a tackifier may be used in a conventional manner. The detackifying resin and particulate cooperate to temporarily reduce the tack and peel characteristics of the pressure-sensitive adhesive and to allow positionability and repositionability.

As used herein, detackifying resin and detackifying particulate refer to non-tacky thermoplastic resins and insoluble solid particles which interact to reduce the tack and suppress adhesion build-up of a normally tacky adhesive base resin and any tackifier present. The detackifying resin is believed to act as a mechanical compatibilizer between the particulate and the adhesive which increases the effectiveness of the particulate in reducing the adhesive contact efficiency. Because less particulate is required to reduce the adhesive contact efficiency to enable positionability-repositionability, the reduction in ultimate peel strength due to the particulate is also less.

The pressure-sensitive adhesives of the invention are substantially non-tacky and positionable. Accordingly, laminates may be slid easily along surfaces to which they are to be applied with the mounting surface and outer adhesive surface in contact. Upon application of an installation pressure, such as that resulting from hand pressing or the use of hand tools to install a laminate, the pressure-sensitive adhesive adheres with a peel strength which is sufficient to retain the laminate in its installed position. This peel strength may range up to 3.0 lb./linear inch or higher depending upon the strength of the substrate.

In contrast with the prior art use of surface disposed particles to physically isolate the adhesive and mounting surfaces as by forming spaces or barriers therebetween, the particulate of the present invention is blended with the adhesive components for interaction therewith, and not concentrated at an outer surface of the pressure-sensitive adhesive layer. Accordingly, the pressure-sensitive adhesives disclosed herein do not require preparation or adhering techniques which are limited to specific surface treatments or surface handling procedures. Further, the inventive adhesives are not characterized by a threshold pressure for final installation, but rather, adhesion builds with the passage of time or application of thermal energy.

The preferred detackifying resins comprise non-tacky thermoplastic resins or polymers having a molecular weight in the range of from about 3,000 to about 350,000. The resins are solid at room temperature and they are also characterized by sites for interaction with the detackifying particle and at least one moiety which is compatible with or interacts with the adhesive base resin or tackifier. Polycaprolactone polymers are preferred detackifying resins for use with acrylic adhesives. As disclosed in U.S. Pat. No. 3,892,821, these polymers are characterized by containing a major molar amount of the following recurring structural linear unit I:

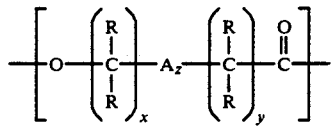

wherein each R, individually, is selected from the class consisting of hydrogen, alkyl, halo and alkoxy; A is the oxy group; x is an integer from 1 to 4; y is an integer from 1 to 4; z is 0 or 1; with the provisos that (a) the sum of $x+y+z$ is at least 4 and not greater than 7, and (b) the total number of R variables which are substituents other than hydrogen does not exceed 3. Illustrative R variables include methyl, ethyl, isopropyl, n-butyl, sec-butyl, t-butyl, hexyl, chloro, bromo, iodo, methoxy, ethoxy, n-butoxy, n-hexoxy, 2-ethylhexoxy, dodecoxy, and the like. The preferred polycaprolactone polymers may be characterized by recurring unit I and up to a minor molar amount of the following recurring structural unit II:

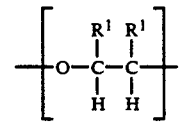

wherein each $R^1$ is selected from the class consisting of, individually, hydrogen, alkyl, cycloalkyl, aryl and chloroalkyl, and, together with the ethylene moiety of the oxyethylene chain of unit II, a saturated cycloaliphatic hydrocarbon ring having from 4 to 8 carbon atoms. The recurring linear unit I is linked by the oxy group with the carbonyl group of the linear unit II. The most preferred polycaprolactone polymers are characterized by the oxypentamethylenecarbonyl chain of the following recurring structural unit III:

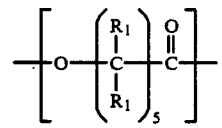

wherein each $R^1$ is hydrogen and water is used as the polymerization initiator to result in hydroxyl termination at both ends of the molecule.

The detackifying particle should be a solid at room temperature and insoluble in the pressure-sensitive adhesive. The average particle size should be in the range of from about 0.01 micron to about 4 microns. The particle should have hydrophilic characteristics capable of hydrogen bonding with the preferred detackifying resin. Such particles often have polar surfaces as are provided by the presence of OH groups. Fumed silica is a preferred particle.

The adhesive base resin is an acrylic adhesive such as those which are composed of homopolymers, copolymers or cross-linked copolymers of at least one acrylic or methacrylic component, for example acrylic esters such as methyl acrylate, ethyl acrylate, n-propyl acrylate, isopropyl acrylate, n-butyl acrylate, isobutyl acrylate, tert-butyl acrylate, amyl acrylate, hexyl acrylate, octyl acrylate, 2-ethylhexyl acrylate, undecyl acrylate or lauryl acrylate, and optionally as a comonomer, a carboxyl-containing monomer such as (meth)acrylic acid [the expression "(meth)acrylic" acid denotes acrylic acid and methacrylic acid], itaconic acid, crotonic acid, maleic acid, maleic anhydride or butyl maleate, a hydroxyl-containing monomer such as 2-hydroxyethyl(meth)acrylate, 2-hydroxypropyl(meth)acrylate or allyl alcohol, an amido-containing monomer such as (meth)acrylamide, N-methyl(meth)acrylamide, or N-ethyl-(meth)acrylamide, a methylol group-containing monomer such as N-methylol(meth)acrylamide or dimethylol(meth)acrylamide, an amino-containing monomer such as aminoethyl(meth)acrylate, dimethylaminoethyl(meth)acrylate or vinylpyridine, or a non-functional monomer such as ethylene, propylene, styrene or vinyl acetate; mixtures thereof; and adhesives containing at least one such adhesives as a main component.

Rubber based adhesives can also be used as the pressure-sensitive adhesive. They may require a detackifying resin which has moieties which are compatible with the rubber based adhesive.

Preferred acrylic adhesive base resins comprise multipolymers based upon a mixture of monomers and typified as being composed of lower glass transition temperature esters. Such acrylic adhesives provide sufficient viscoelastic flow to assure adequate build-up of adhesion. Upon passage of time and/or application of thermal energy, the ultimate peel value may be equal to about 90% or more of the value achieved by the base resin and any tackifier without detackifying resin and particle.

The use of a tackifier is optional. Conventional tackifiers such as hydrogenated rosin esters may be used. The use of a tackifier enables achievement of increased levels of adhesion and peel value, but its use is not necessary to recovery of available peel. Since 90% recovery is achieved in most cases, the use of a tackifier is determined by the need to increase the overall level of adhesion and peel strength.

Pressure-sensitive adhesives in accordance with the invention may include from about 1 to about 30% detackifying resin on a dry weight basis and, more preferably, from about 4% to about 20%. (Unless otherwise indicated, all weight percentages are on a dry weight basis of the final pressure-sensitive adhesive.) The detackifying particle may be used in amounts ranging from about 1% to about 15% by weight and, more preferably from about 3% to about 12%. If a tackifier is used, it may be added in amounts ranging up to about 30% by weight and, more preferably, up to about 20% by weight. The tackifier may be used in the pressure-sensitive adhesives of the present invention to increase the ultimate adhesion or peel strength in the same manner as used in conventional pressure-sensitive adhesives. The adhesive base resin forms the remainder of the pressure-sensitive adhesive and it ranges in amount from about 25% to about 98% by weight. If a tackifier is not used, the adhesive base resin ranges from about 45% to about 98% by weight of the pressure-sensitive adhesive.

The substrate is not critical to the invention and may be formed of a wide variety of materials in accordance with the intended application. The substrate thickness may range from about 0.5 mil or less to about 20 mils. The substrate may comprise plastic film, paper material, metal foil or other suitable sheet or web material. The substrate may be a facestock material suitable for display of indicia applied thereto in conventional manners such as printing or coating.

The pressure-sensitive adhesive may be applied to the substrate by knife-coating, roll-coating and other conventional techniques. Alternatively, the pressure-sensitive adhesive may be applied to a liner or carrier web and then joined to the substrate. The thickness of the pressure-sensitive adhesive is not critical to the invention and conventional application thicknesses in the range of from about 0.5 to about 4 mils may be used.

It is also within the scope of the invention to use the pressure-sensitive adhesive as an exterior or overcoat layer on a layer of compatible adhesive which does not have positionable-repositionable properties. For example, such compatible adhesive may comprise a pressure-sensitive adhesive of the same base resin but without the detackifying resin and particle. Successive coatings may be used to provide such a combined adhesive construction.

BRIEF DESCRIPTION OF THE DRAWINGS

FIG. 4 is a graph showing the effect on peel strength of pressure-sensitive adhesives containing varying amounts of detackifying resin and varying amounts of detackifying particle.

DETAILED DESCRIPTION OF THE INVENTION

Figure 1:
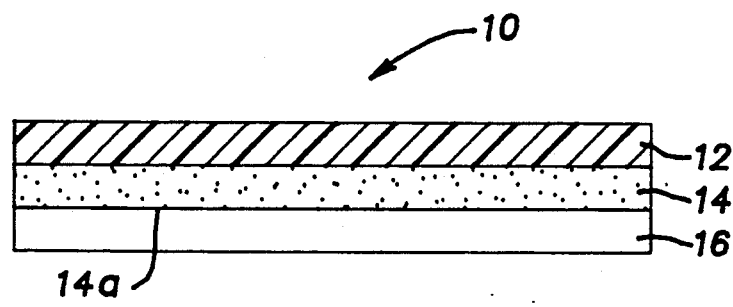
FIG. 1 is a schematic cross-sectional view of a laminate including a substrate layer and a pressure-sensitive adhesive layer in accordance with the invention.

Referring to FIG. 1, a laminate 10 is shown comprising a substrate or carrier layer 12 secured to a pressure-sensitive adhesive layer 14. A conventional release liner 16 having a low energy surface of silicone or the like may be applied to the outer surface 14a of the adhesive layer 14 to protect it from contamination when the laminate 10 is in sheet form or to allow the laminate to be wound in roll form. The laminate 10 may be self-wound without the use of a liner 16 depending upon the composition of the substrate layer 12.

Figure 2:
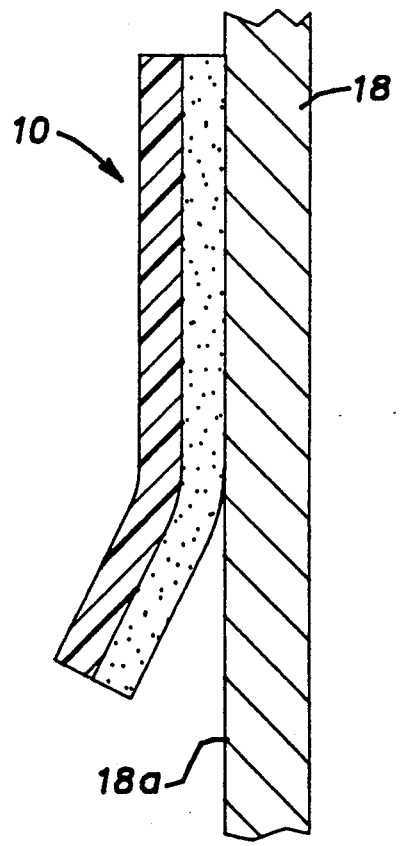
FIG. 2 is a schematic sectional view similar to FIG. 1 showing the laminate partially applied to a wall of a vehicle.

Referring to FIG. 2, the laminate 10 is shown partially applied or installed to an exterior sidewall 18 of a vehicle body and, more particularly, to a mounting or application surface 18a of the wall 18. In such applications, the laminate 10 is typically applied by hand using a flexible blade squeegee and stiff bristle brush to conform the laminate with the contour of the application surface. In order to obtain register of indicia and/or improve conformity, the laminate may be adhered to the surface with full installation pressure and removed several times. The pressure-sensitive adhesives of the present invention enable such installation procedures. In such applications, the pressure-sensitive adhesives also provide a permanent bond suitable for use in vehicle applications and fleet marking.

The adhesive products of the present invention are illustrated in the following examples. Unless otherwise indicated, the pressure-sensitive adhesives are applied to plastic film substrates to produce laminates suitable as facestock material. The facestock materials are repeatedly positionable-repositionable, and the pressure-sensitive adhesive develops a permanent bond.

An acrylic resin sold by Ashland Chemical Company under the designation A 1930 is used as the adhesive base resin in the pressure-sensitive adhesive of Example 1. The adhesive base resin is an acrylate multi-polymer typified by lower glass transition temperature esters. The adhesive base resin is solvent borne and cross-links during cure.

The detackifying resin is a polycaprolactone polymer sold by Union Carbide Corporation under the designation Tone 300. This is a linear polymer having an oxypentamethylenecarbonyl chain of recurring structural unit III as indicated above. The recurring ester groups along the molecule provide a dipole distribution believed to allow interaction with the detackifying particle and/or adhesive base. The polycaprolactone polymer has a molecular weight range of 3,000 to 90,000 and weight mean of 10,000.

The detackifying particulate is silica sold under the designation Cab-O-Sil M-5 by Cabot Corporation. This is a fumed silica having an average particle size of about 0.012 micron. The particles are hydrophilic and are believed to undergo hydrogen bonding with the detackifying resin and may nucleate the crystallization of the polycaprolactone.

A tackifier sold by Ashland Chemical Company under the designation PS 293 was used. Alternatively, a hydrogenated rosin ester sold by Hercules Chemical Company under the designation Foral 85 may be used.

On dry weight basis, 116 parts of the adhesive base resin, 20 parts of the detackifying resin and 30 parts of the tackifier are blended in a toluene and hexane solvent mixture. The mixture is heated sufficiently to assure that the detackifying resin is dissolved or dispersed. For example, the mixture may be heated to temperatures in the range of about 140° F. A smooth homogeneous mixture is obtained with sufficient heating and mixing. Thereafter, 13.4 parts of the detackifying particle is added to the mixture and uniformly dispersed with further mixing. The pressure-sensitive adhesive is drawn-down on a release sheet and then transfer laminated after cure to a two mil thick vinyl plastic film substrate. The coat weight of the adhesives is 33 g/m$^2$±2 g/m$^2$.

Using the procedures and components of Example 1, comparative Examples 1C through 6C were prepared to evaluate deletion and concentration variation of detackifying resin and particulate components. The compositions are summarized in Table I below.

TABLE I

| NUMBER | BASE ADHESIVE | DETACK RESIN | DETACK PARTICLE | TACKIFIER |
|---|---|---|---|---|
| 1C | 116 | 0 | 13.4 | 30 |
| 2C | 116 | 20 | 0 | 30 |
| 3C | 116 | 0 | 0 | 30 |
| 4C | 116 | 10 | 6.7 | 30 |
| 5C | 116 | 40 | 0 | 30 |
| 6C | 116 | 0 | 26.8 | 30 |

Example 1 and Comparative Examples 1C–6C were tested for tack using a Polyken tester. Also, the 180° peel values were tested at one minute and 20 minute intervals following installation. (All peel tests were performed using a stainless steel mounting surface.) The maximum peel values were tested one week after installation. The results of these tests are set forth in Table II.

TABLE II

| NO. | TACK(g) | PEEL (lb./LINEAR INCH) | | |
|---|---|---|---|---|
| | | 1 Min. | 20 Min. | 1 Week |
| 1 | 59 ± 12 | 2.97 ± .03 | 3.47 ± .35 | 5.70 ± .10 |
| 1C | 170 ± 20 | 2.70 ± .00 | 3.57 ± .15 | 6.27 ± .06 |
| 2C | 289 ± 73 | 3.28 ± .16 | 4.33 ± .29 | 6.67 ± .42 |
| 3C | 369 ± 71 | 3.80 ± .17 | 4.50 ± .00 | 6.30 ± .20 |
| 4C | 129 ± 38 | 2.93 ± .29 | 4.27 ± .12 | 6.53 ± .40 |
| 5C | 270 ± 53 | 2.53 ± .25 | 3.60 ± .00 | 6.00 ± .17 |
| 6C | 62 ± 24 | 1.90 ± .10 | 2.93 ± .06 | 4.67 ± .06 |

As shown in Table II, both the detackifying resin and particle are required to achieve an adequate reduction in tack to enable positionability. Comparative Example 3C is considered to represent the base system since it contains neither detackifying resin nor detackifying particle, the relative percent performance of the other examples and comparative examples may be measured against it. Thus, Example 1 has a one week peel value of 5.70 lb./linear in. which is equal to 90% of the one week peel value of Comparative Example 3C.

Comparison of Example 1 with Examples 5C and 6C indicates that the detackifying resin and particulate interact to reduce tack and suppress adhesion build-up in a manner such that neither component alone is required in an amount which will also result in an excessive reduction of peel strength. The use of detackifying resin alone in increased amounts does not enable satisfactory tack values and excessive reductions in the ultimate peel strength occur. Although detackifying particles used alone in increased amounts enable satisfactory tack values, excessive reductions in peel strength also occur.

The compositions of Examples 1, 1C, 2C, 3C and 6C were further examined to better characterize the interaction between the detackifying resin and particulate. Samples of the compositions were drawn-down on a silicone release sheet and dried as described above in Example 1 to form adhesive layers of the various compositions.

Each of the surfaces of the adhesive layers of the compositions of Examples 1 and 1C was examined by X-ray photoelectron spectroscopy. The examination did not detect any sign of silicon characteristic of that found in the silica particulate in the outer 50 angstroms of the layers. This indicates the detackification obtained is not due to any preferential concentration of the particulate at the adhesive surfaces as was required in some prior art techniques.

The compositions of Examples 1, 1C, 2C, 3C and 6C were also examined using dynamic mechanical spectroscopy. The dynamic shear storage modulus ($G^1$) of an adhesive, measured at a frequency corresponding to the time scale of bonding, indicates the softness and conformability or contact efficiency of the adhesive. The higher the value of $G^1$ at the frequency of 1–0.01 rad/sec (corresponding to a bonding time scale of 1–100 seconds) the less flowable the adhesive and the lower the tack or quick-stick, e.g. a lower Polyken tack and better positionability are obtained. Carl Dahlquist has proposed a contact efficiency criteria which translates to the proposition that pressure-sensitive adhesives are contact efficient if $G^1$ at 1 rad/sec is less than $3 \times 10^6$ dynes/cm$^2$.

Referring to Table IIA below, the dynamic shear storage moduli ($G^1$) at 0.01 rad/sec and 1 rad/sec are reported for the compositions of Examples 1, 1C, 2C 3C and 6C. All modulus measurements were made in accordance with ASTM D 4065-82 using a Rheometrics Mechanical Spectrometer (RMS 800) with parallel plate specimen mounting and a forced constant amplitude-torsional oscillation frequency scan at a constant temperature of 23° to 25° C.

TABLE IIA

| NUMBER | $G^1 \times 10^5$ (dynes/cm$^2$) | |
|---|---|---|
| | 0.01 rad/sec | 1 rad/sec |
| 1 | 28.1 | 74.8 |
| 1C | 3.2 | 14.8 |
| 2C | 1.2 | 5.7 |
| 3C | 1.2 | 7.1 |
| 6C | 21.8 | 43.5 |
| Dahlquist Criteria | | 30 |

The addition of inert particulate or filler to a pressure-sensitive adhesive will stiffen the adhesive and raise its $G^1$ value so as to make it less contact efficient. This is shown by comparing the increasing $G^1$ values at 1 rad/sec for Examples 3C, 1C and 6C which respectively contain 0, 13.4 and 26.8 parts of particulate and no detackifying resin. Unexpectedly, the addition of detackifying resin in combination with 13.4 parts of particulate in Example 1 raised the $G^1$ value to 74.8 even though the addition of the resin by itself in Example 2C lowered the $G^1$ value to 5.7 as compared with the $G^1$ value of 7.1 in Example 3C which contains neither detackifying resin or particulate.

The unexpected increase in the $G^1$ value and positionability of Example 1 as shown in Table IIA result from the detackifying resin and particulate interaction. More particularly, the polycaprolactone detackifying resin is compatible with the adhesive and interacts with the surface of the silica particulate thereby acting as a mechanical compatibilizer between the adhesive and the silica particles. This increases the effectiveness of the particles in raising the dynamic shear storage modulus of the adhesive.

The addition of inert particulate or filler to a pressure-sensitive adhesive tends to decrease its ultimate peel strength. This is shown by comparing the decreasing one-week peel strength for Examples 3C, 1C and 6C which respectively contain 0, 13.4 and 26.8 parts of particulate and no detackifying resin. The final peel force achieved with pressure, time and/or thermal energy is a function of the level of mechanical dissipation of the volume of polymeric material in the adhesive that can contribute to the mechanical dissipation in the time scale of debonding. The inert particulate or fillers do not contribute to the debonding as they do not deform under the applied peel stress. Accordingly, the enhancement of the particulate effectiveness in achieving positionability by the detackifying resin enables a reduced amount of particulate to be used and a lesser reduction of the ultimate peel strength as compared with a similar laminate except for the omission of the detackifying resin. Similarly, for a given amount of particulate consistent with a desired ultimate peel strength, the detackifying resin may be used to enable positionability and achievement of the desired peel strength.

The adhesive base resin of the pressure-sensitive adhesive and tackifier of Example 1 were aged for a one week period before repeating the preparation of a corresponding series of laminates. Referring to Table III, the test results are reported for the aged samples. The coaction of the detackifying resin and particles is again demonstrated by the data.

TABLE III

| NO. | TACK(g) | PEEL (lb./LINEAR INCH) | | |
|---|---|---|---|---|
| | | 1 Min. | 20 Min. | 1 Week |
| 2 | 40 ± 13 | 2.87 ± .06 | 3.57 ± .06 | 5.27 ± .21 |
| 7C | 208 ± 32 | 2.37 ± .06 | 3.57 ± .06 | 5.97 ± .25 |
| 8C | 212 ± 67 | 3.43 ± .06 | 4.07 ± .25 | 5.57 ± .12 |
| 9C | 452 ± 39 | 3.60 ± .20 | 4.63 ± .15 | 5.70 ± .20 |
| 10C | 288 ± 64 | 3.10 ± .35 | 3.60 ± .10 | 6.13 ± .31 |
| 11C | 208 ± 32 | 2.67 ± .15 | 3.57 ± .12 | 5.60 ± .17 |
| 12C | 85 ± 26 | 2.03 ± .21 | 2.87 ± .15 | 4.70 ± .00 |

Using the procedure and formulation of Example 1, Example 3 was prepared in accordance with the invention as a standard for comparison with similar adhesives containing varying amounts of detackifying resin. More particularly, Examples 3-1 to 3-6 were prepared by varying the amount of detackifying resin, Tone 300, between 35% and 160% of the amount used in Example 3 without varying the other components. The twenty minute peel strength of Example 3 was 2.17 lb./linear inch. The peel strength of Examples 3-1 to 3-6 are reported below in Table IV.

TABLE IV

| | Example Number | | | | | |
|---|---|---|---|---|---|---|
| | 3-1 | 3-2 | 3-3 | 3-4 | 3-5 | 3-6 |
| Relative Amount of Detack Resin | +60 | +40 | +20 | −45 | −55 | −65 |
| 20 Minute Peel | 1.53 | 1.33 | 1.63 | 2.27 | 1.87 | 1.90 |

In a manner similar to that described immediately above, Example 4 was prepared as a standard using the procedure and formulation of Example 1 except for the replacement of Tone 300 with a higher molecular weight detackifying resin, Tone 700. This resin is similar to Tone 300, but it has a molecular weight range of 11,000 to 342,000 and a weight mean of 40,000. The twenty minute peel strength of Example 4 was 2.67 lb./linear inch. As also described above, Examples 4-1 to 4-3 were prepared and tested for twenty minute peel strength. The results are reported below in Table V.

TABLE V

| | Example Number | | |
|---|---|---|---|
| | 4-1 | 4-2 | 4-3 |
| Relative Amount of Detack Resin | −40 | −60 | −80 |
| 20 Minute Peel | 2.90 | 3.05 | 3.00 |

Figure 3:
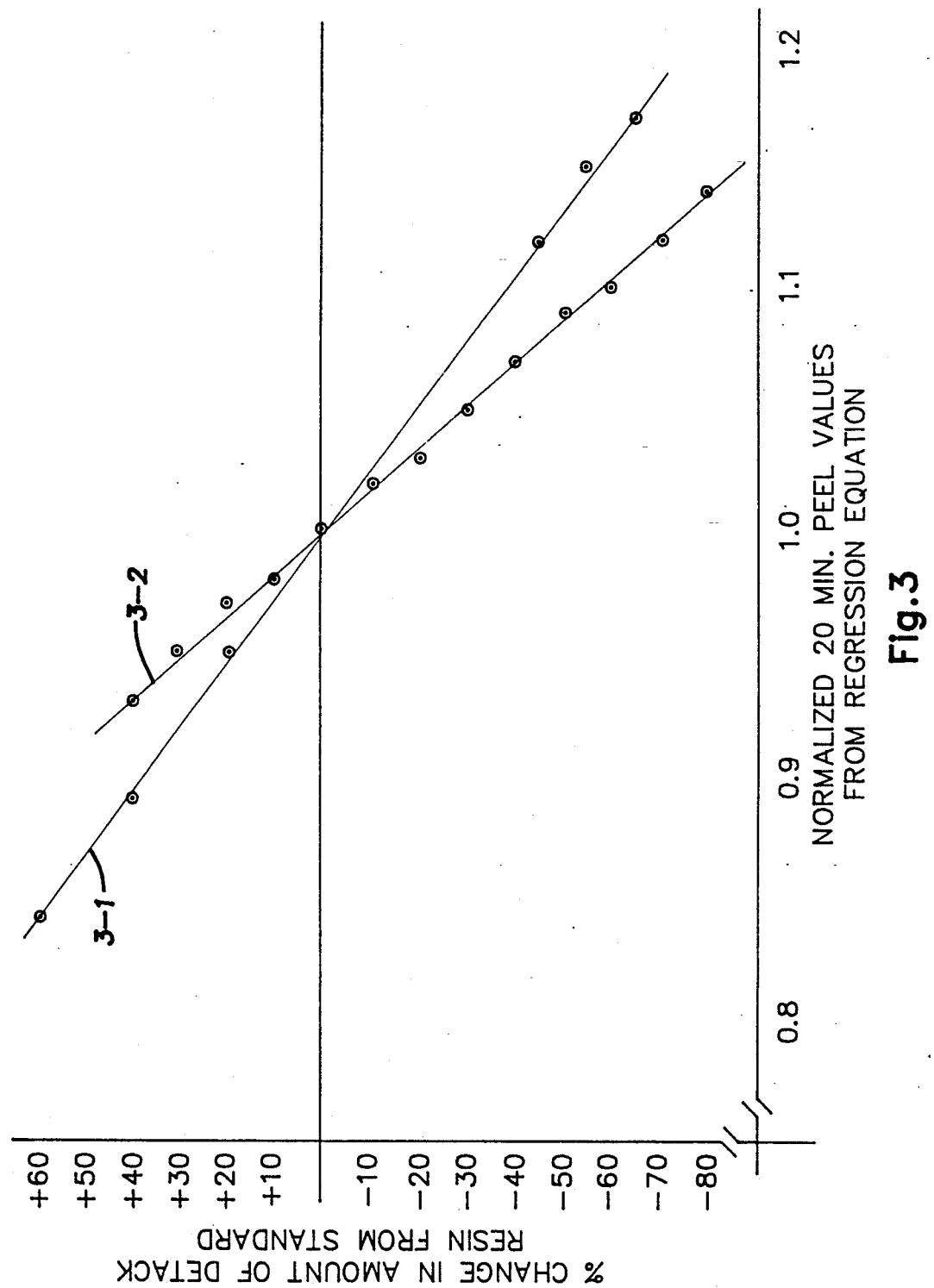
FIG. 3 is a graph showing the effect on peel strength of pressure-sensitive adhesives containing varying amounts of two different detackifying resins.

Referring to FIG. 3, the results reported in Tables IV and V are graphically shown using regression analysis. Curve 3-1 corresponds with the data of Table IV for Tone 300 and curve 3-2 corresponds with the data of Table V for Tone 700. (A low adhesion aluminum mounting surface was used for these tests so as to result in lower one week peel values than obtained with stainless steel or painted aluminum mounting surfaces.) As indicated, a unit variation in the amount of either detackifying resin causes a similar effect on peel strength.

The effect of varying the amount of detackifying resin or varying the amount of detackifying particle is demonstrated with reference to a standard pressure-sensitive adhesive, Example V, prepared in accordance with the procedures and formulation of Example 1. In a first series of Examples 5-1 to 5-4, the amount of detackifying resin (Tone 300) was varied between 45% and 140% of the amount used in Example 5 without varying the amounts of other components. In a second series of Examples 5-5 to 5-10, the amount of detackifying particle (Cab-O-Sil M-5) was varied between 35% and 160% of the amount used in Example 5 without varying the amount of the other components. The one week peel strength of Examples 5 was 3.8 lb./linear inch. The one week peel strength of each of Examples 5-1 to 5-10 is reported in Table VI. (A low adhesion aluminum mounting surface was used for these tests so as to result in lower one week peel values than obtained with stainless steel or painted aluminum mounting surfaces.)

TABLE VI

| EXAMPLE NO. | RELATIVE AMOUNT DETACK RESIN (%) | RELATIVE AMOUNT DETACK PARTICLE (%) | 1 WK. PEEL |
|---|---|---|---|
| 5-1 | No Change | +40 | 2.77 |
| 5-2 | No Change | +20 | 2.97 |
| 5-3 | No Change | −45 | 4.60 |
| 5-4 | No Change | −55 | 4.93 |
| 5-5 | +60 | No Change | 3.07 |
| 5-6 | +40 | No Change | 2.90 |
| 5-7 | +20 | No Change | 2.80 |
| 5-8 | −45 | No Change | 3.77 |
| 5-9 | −55 | No Change | 3.77 |
| 5-10 | −65 | No Change | 4.47 |

Employing regression analysis, the data of Table VI are graphically shown in FIG. 4 as curve 4-1 for variation of detackifying resin concentration and curve 4-2 for variation of detackifying particle concentration. As shown in FIG. 4, a greater change in peel strength occurs for a given change in the amount of detackifying particle than occurs for a corresponding change in the amount of detackifying resin for the examined system.

The procedures of Example 1 were used to prepare the following pressure-sensitive adhesives shown in Table VII.

TABLE VII

| EXAMPLE NUMBER | ADHESIVE BASE RESIN | DETACK RESIN | DETACK PARTICLE[2] | TACKIFIER |
|---|---|---|---|---|
| 6 | 116[3] | 20 | 13.4 | 0 |
| 7 | 116[4] | 20 | 13.4 | 30[5] |
| 8 | 116[4] | 20 | 13.4 | 0 |

[1]Tone 300 sold by Union Carbide Corporation
[2]Cab-O-Sil M-5 sold by Cabot Corporation
[3]An acrylic polymer sold by Ashland Chemical Company under the designation Aroset 1877
[4]An acrylic polymer sold by Monsanto Chemical Company under the designation Gelva 1753
[5]Tackifier sold by Ashland Chemical Company under the designation PS 293

The pressure-sensitive adhesive of Examples 6-8 were transfer laminated onto two mil vinyl substrates to provide laminates useful as positionable-repositionable facestock materials. The tack of Example 6 was 36±28 g. as measured using a Polyken tester. The 20 minute peel values are reported in Table VIII.

TABLE VIII

| EXAMPLE | Peel (lb./LINEAR INCH) 20 Minute |
|---|---|
| 6 | 2.75 ± .07 |
| 7 | 2.30 ± .00 |
| 8 | 2.20 ± .00 |

Repositionability is indicated for Examples 6, 7 and 8 by 20 minute peel values less than 2.75 lb./linear inch. After 3 days, the peel values for each of the examples exceeded 3.0 lbs./linear inch.

Using laminates prepared in accordance with Example 1, the increase in adhesion build-up with the application of heat was evaluated at temperatures ranging from 110° F. to 150° F. in 10 degree increments for incremental time intervals up to a total of 30 minutes. Each laminate was applied to a stainless steel test surface by hand using a plastic squeegee to firmly position the laminate and then heated for the indicated time and temperature. Following heating, the laminate and test surface were allowed to cool at room temperature and then tested for peel strength. The results are reported below in Table IX.

TABLE IX

| EXAMPLE | TEMP (°F.) | 5 MIN. | 10 MIN. | 15 MIN. | 20 MIN. | 30 MIN. |
|---|---|---|---|---|---|---|
| 9 | 110 | 2.63 ± .06 | 2.87 ± .15 | 2.97 ± .15 | 3.20 ± .10 | 3.20 ± .10 |
| 10 | 120 | 2.80 ± .13 | 3.10 ± .15 | 3.23 ± .15 | — | 3.73 ± .15 |
| 11 | 130 | 2.93 ± .15 | 3.47 ± .20 | 3.50 ± .20 | 3.97 ± .15 | 3.93 ± .23 |
| 12 | 140 | 3.30 ± .1 | 3.47 ± .17 | 3.50 ± .17 | 3.83 ± .15 | 3.93 ± .12 |
| 13 | 150 | 4.03 ± .25 | 4.40 ± .25 | 4.63 ± .25 | 4.17 ± .06 | 4.60 ± .26 |

As shown in Table IX, the rate of adhesion build-up of the pressure-sensitive adhesives in accordance with the invention increases with temperature. Temperatures in the range of 150° F. for relatively short intervals of time such as 5 to 10 minutes achieve substantial adhesion build-up as compared with the use of lower temperatures for longer time periods.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

We claim:

1. A laminate comprising a substrate and a layer of pressure-sensitive adhesive for adhering the laminate to a mounting surface, said pressure-sensitive adhesive containing a pressure-sensitive adhesive base resin, a detackifying resin and a detackifying particulate, said detackifying resin comprising a substantially linear polycaprolactone polymer having a molecular weight in the range of from about 3,000 to about 342,000, said detackifying resin and particulate interacting to increase the effectiveness of the particulate in raising the dynamic shear storage modulus of the pressure-sensitive adhesive to about $30 \times 10^5$ dynes/cm$^2$ or higher at 1 rad/sec at a temperature of 23° to 25° C. with a lesser decrease in ultimate peel strength as compared with a similar laminate except for the omission of said detackifying resin, and thereby reducing tack and suppressing adhesion build-up temporarily during installation of said laminate to said mounting surface and causing adhesion build-up subsequently due to the passage of time such that said laminate is permanently bonded to said mounting surface in about one week.

2. A laminate as set forth in claim 1, wherein said pressure-sensitive adhesive also contains a tackifier.

3. A laminate as set forth in claim 1, wherein said detackifying resin is a mechanical compatibilizer for said detackifying particulate with respect to said pressure-sensitive adhesive.

4. A laminate as set forth in claim 3, wherein said detackifying resin in the absence of said detackifying particulate decreases said dynamic shear storage modulus at 1 rad/sec and a temperature of 23° to 25° C.

5. A laminate as set forth in claim 1, wherein said detackifying resin and particulate cooperate to temporarily reduce said tack and suppress adhesion build-up for about thirty minutes following installation of said laminate to said mounting surface.

6. A laminate as set forth in claim 5, wherein adhesion build-up due to the passage of time provides said pressure-sensitive adhesive with a peel strength after one week equal to at least about 90% of the peel strength of a similar adhesive not containing said detackifying resin and particulate.

7. A laminate as set forth in claim 1, wherein said layer of pressure-sensitive adhesive overlies a compatible adhesive layer interposed between said first-named adhesive layer and said substrate.

8. A laminate as set forth in claim 1, wherein said detackifying particulate is fumed silica.

9. A laminate as set forth in claim 1, wherein said detackifying resin linear polycaprolactone polymer is a polycaprolactone polymer having a major molar amount of recurring units I of the formula:

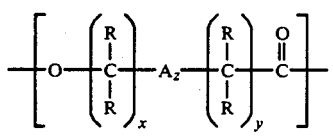

wherein each R, individually, is selected from the class consisting of hydrogen, alkyl, halo and alkoxy; A is the oxy group; x is an integer from 1 to 4; y is an integer from 1 to 4; z is 0 or 1; with the provisos that (a) the sum of x+y+z is at least 4 and not greater than 7, and (b) the total number of R variables which are substituents other than hydrogen does not exceed 3, and up to a minor molar amount of the following recurring structural unit II:

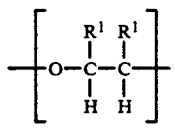

wherein each $R^1$ is selected from the class consisting of, individually, hydrogen, alkyl, cycloalkyl, aryl and chloroalkyl, and, together with the ethylene moiety of the oxyethylene chain of unit II, a saturated cycloaliphatic hydrocarbon ring having from 4 to 8 carbon atoms.

10. A laminate as set forth in claim 9, wherein said detackifying particulate is hydrophilic silica and said adhesive base resin is an acrylic adhesive.

11. A laminate as set forth in claim 10, wherein said pressure-sensitive adhesive contains from about 1% to about 30% detackifying resin, from about 1% to about 15% detackifying particulate and from about 55% to about 98% adhesive base resin based on the dry weight of the pressure-sensitive adhesive.

12. A laminate as set forth in claim 1, wherein said detackifying resin linear polycaprolactone polymer is a polycaprolactone polymer characterized by the recurring structural unit III of the formula:

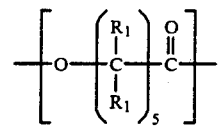

wherein each $R^1$ is hydrogen and water is used as the polymerization initiator to result in hydroxyl termination at both ends of the molecule.

13. A laminate as set forth in claim 12, wherein said detackifying particulate is silica.

14. A laminate as set forth in claim 13, wherein said adhesive base resin is an acrylic adhesive.

15. A laminate as set forth in claim 14, wherein said acrylic adhesive is a multi-polymer based upon a mixture of monomers and typified as being composed of lower glass transition esters.

16. A laminate as set forth in claim 15, wherein said pressure-sensitive adhesive contains from about 1% to about 30% detackifying resin, from about 1% to about 15% detackifying particulate and from about 55% to about 98% adhesive base resin based on the dry weight of the pressure-sensitive adhesive.

17. A laminate as set forth in claim 16, wherein said substrate layer is a facestock material.

18. A laminate as set forth in claim 1, wherein adhesion build-up due to the passage of time provides said pressure-sensitive adhesive with a peel strength such that said laminate is permanently bonded to said mounting surface and cannot be removed by peeling without damaging the laminate.

19. A laminate as set forth in claim 1, wherein said pressure-sensitive adhesive contains from about 1% to about 30% by weight of said detackifying resin based on the dry weight of the pressure-sensitive adhesive.

20. A laminate as set forth in claim 1, wherein said adhesive base resin is an acrylic adhesive.

21. A laminate as set forth in claim 1, wherein said pressure-sensitive adhesive contains from about 1% to about 30% detackifying resin, from about 1% to about 15% detackifying particulate and from about 55% to about 98% adhesive base resin based on the dry weight of the pressure-sensitive adhesive.

22. A laminate as set forth in claim 21, wherein said adhesive base resin is an acrylic adhesive.

23. A laminate comprising a substrate and a layer of pressure-sensitive adhesive for adhering the laminate to a mounting surface, said pressure-sensitive adhesive containing a pressure-sensitive adhesive base resin, a detackifying resin and a detackifying particulate, said detackifying resin comprising a polycaprolactone polymer having a major molar amount of recurring units I of the formula:

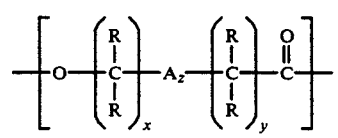

wherein each R, individually, is selected from the class consisting of hydrogen, alkyl, halo and alkoxy; A is the oxy group; x is an integer from 1 to 4; y is an integer from 1 to 4; z is 0 or 1; with the provisos that (a) the sum of x+y+z is at least 4 and not greater than 7, and (b)

the total number of R variables which are substituents other than hydrogen does not exceed 3, and up to a minor molar amount of the following recurring structural unit II:

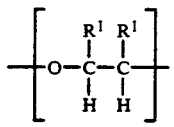

wherein each $R^1$ is selected from the class consisting of, individually, hydrogen, alkyl, cycloalkyl, aryl and chloroalkyl, and, together with the ethylene moiety of the oxyethylene chain of unit II, a saturated cycloaliphatic hydrocarbon ring having from 4 to 8 carbon atoms, said detackifying resin and particulate interacting to increase the effectiveness of the particulate in raising the dynamic shear storage modulus of the pressure-sensitive adhesive to about $30 \times 10^5$ dynes/cm$^2$ or higher at 1 rad/sec at a temperature of 23° to 25° C. with a lesser decrease in ultimate peel strength as compared with a similar laminate except for the omission of said detackifying resin, and thereby reducing tack and suppressing adhesion build-up temporarily during installation of said laminate to said mounting surface and causing adhesion build-up subsequently due to the passage of time such that said laminate is permanently bonded to said mounting surface in about one week.

24. A laminate comprising a substrate and a layer of pressure-sensitive adhesive for adhering the laminate to a mounting surface, said pressure-sensitive adhesive containing a pressure-sensitive adhesive base resin, a detackifying resin and a detackifying particulate, said detackifying resin and particulate interacting to increase the effectiveness of the particulate in raising the dynamic shear storage modulus of the pressure-sensitive adhesive whereby positionability and repositionability of said laminate is achieved with a lesser decrease in ultimate peel strength as compared with a similar laminate except for the omission of said detackifying resin, said detackifying resin being a polycaprolactone polymer having a major molar amount of recurring units I of the formula:

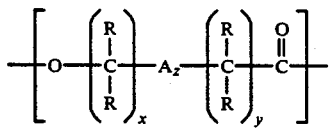

wherein each R, individually, is selected from the class consisting of hydrogen, alkyl, halo and alkoxy; A is the oxy group; x is an integer from 1 to 4; y is an integer from 1 to 4; z is 0 or 1; with the provisos that (a) the sum of x+y+z is at least 4 and not greater than 7, and (b) the total number of R variables which are substituents other than hydrogen does not exceed 3, and up to a minor molar amount of the following recurring structural unit II:

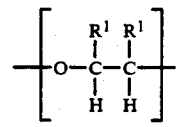

wherein each $R^1$ is selected from the class consisting of, individually, hydrogen, alkyl, cycloalkyl, aryl and chloroalkyl, and, together with the ethylene moiety of the oxyethylene chain of unit II, a saturated cycloaliphatic hydrocarbon ring having from 4 to 8 carbon atoms, said detackifying particulate being a hydrophilic silica and said adhesive base resin being an acrylic adhesive.

25. A laminate as set forth in claim 24, wherein said pressure-sensitive adhesive contains from about 1% to about 30% detackifying resin, from about 1% to about 15% detackifying particulate and from about 55% to about 98% adhesive base resin based on the dry weight of the pressure-sensitive adhesive.

26. A laminate comprising a substrate and a layer of pressure-sensitive adhesive for adhering the laminate to a mounting surface, said pressure-sensitive adhesive containing a pressure-sensitive adhesive base resin, a detackifying resin and a detackifying particulate, said detackifying resin and particulate interacting to increase the effectiveness of the particulate in raising the dynamic shear storage modulus of the pressure-sensitive adhesive whereby positionability and repositionability of said laminate is achieved with a lesser decrease in ultimate peel strength as compared with a similar laminate except for the omission of said detackifying resin, said detackifying resin being a polycaprolactone polymer characterized by the recurring structural unit III of the formula:

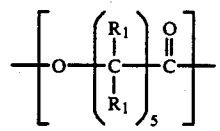

wherein each $R^1$ is hydrogen and water is used as the polymerization initiator to result in hydroxyl termination at both ends of the molecule, said detackifying particulate is silica.

27. A laminate as set forth in claim 26, wherein said acrylic adhesive is a multi-polymer based upon a mixture of monomers and typified as being composed of lower glass transition esters.

28. A laminate as set forth in claim 27, wherein said pressure-sensitive adhesive contains from about 1% to about 30% detackifying resin, from about 1% to about 15% detackifying particulate and from about 55% to about 98% adhesive base resin based on the dry weight of the pressure-sensitive adhesive.

29. A laminate as set forth in claim 28, wherein said substrate layer is a facestock material.

* * * * *